H. A. NICHOLS.
Corn Planter.
No. 107,402.
Patented Sept. 13, 1870.
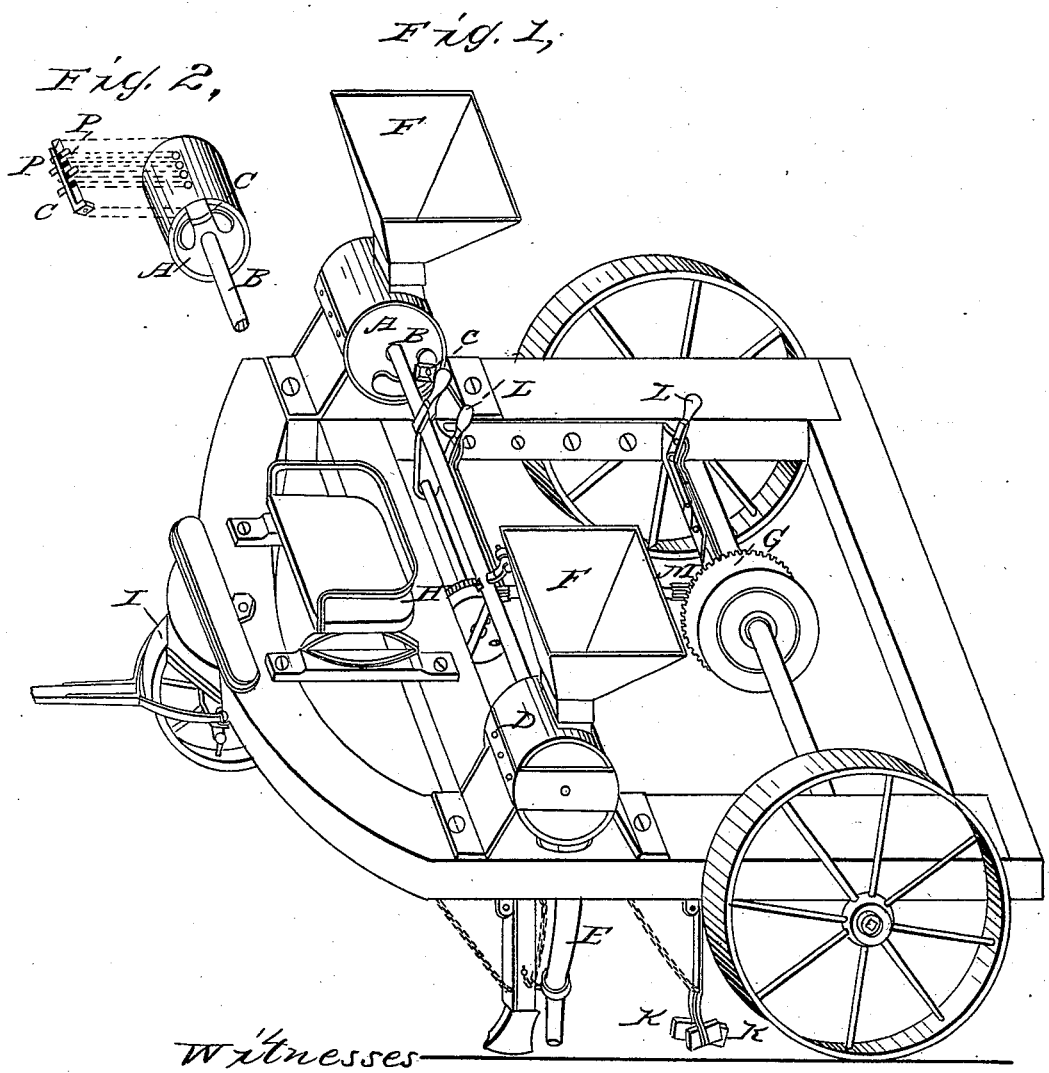

United States Patent Office.

HENRY AUSTIN NICHOLLS, OF ST. LOUIS, MISSOURI, ASSIGNOR TO ALONZO B. PEARSON, OF SAME PLACE.

Letters Patent No. 107,402, dated September 13, 1870.

IMPROVEMENT IN CORN-PLANTERS.

The Schedule referred to in these Letters Patent and making part of the same.

Be it known that I, HENRY AUSTIN NICHOLLS, in the city and county of St. Louis and State of Missouri, have invented new and useful Improvements in Machines for Planting; and I do hereby declare that the following is a full, clear, and exact description of the construction and operation of the said machine, reference being had to the annexed drawing making a part of this specification.

Description of Annexed Drawing.

Figure 1 is an isometrical perspective view of the machine, showing the whole of my invention, except the cylinder and its appurtenances inside the drums D D.

Figure 2 is a view of the works inside the drums D D, and showing, also, the plugs used for regulating the dropping of the grain.

General Description.

The frame of the machine should be substantially constructed so as to resist the vibrations of the working parts and the jolting and jarring produced whenever the wheels meet resisting objects, or pass over uneven surfaces. The whole or any portion of this machine may be constructed of wood, iron, or any other material adapted for that purpose, and most readily obtained in the place where the machine may be manufactured.

A A is the cylinder, which works inside the drums D D, and carries the seed-corn from the hoppers to the leaders E.

B B is the shaft connecting the cylinders A A, and, by a crank-connection with the counter-wheel H, it regulates the action of, and communicates motion to, the cylinders A A.

C C C are studs placed inside the cylinders A A, and made fast by a screw. They are a portion of the contrivance used for regulating the dropping of the grain.

D D are the drums covering the cylinders A A and appurtenances.

E is one of the leaders, receiving the seed-grain from the receptacles in the cylinders A A and depositing it in a furrow in the soil, and immediately back of the plows.

F F are hoppers, in which is to be placed the grain that it is intended to plant.

G is a large center-wheel, with cogs. It is connected, by a shaft through its center, with the carriage-wheels, from which it derives motion, and, by connecting its cogs with those of the cogs and shaft marked M M, it communicates motion to the entire working-parts of the machine. This wheel G and its counter-wheel H may be of larger or smaller dimensions, to suit purchasers, and to increase or diminish the number of droppings made by the machine.

H is a counter-wheel, with cogs, connected, by the cogs and shaft M M with the center-wheel G, and communicating motion, by means of a crank, to the cylinder-shaft B B.

I is a forward carriage-wheel, and is adapted to this machine for the purposes of keeping the weight of the machine and its contents from off the horses' backs, to facilitate in turning in short spaces, and for greater convenience in preserving a steady contact of the planting contrivances with the soil in which the grain is to be planted.

Two plows are attached to the frame of the machine, beneath and a little forward of the drums D D, by heavy bolt-hinges or joints, and sustained in position, when in operation, by stout chains. When not in use, these plows may be raised, by virtue of the bolt-hinges, to a parallel position beneath and forward of the frame of the machine.

The plows are composed of two equal-sized shears each, and are used for the purpose of throwing up a smooth, flat-bottomed, or square furrow, in which the seed may have sufficient room to scatter when dropped into it through the leaders E E, which are situated immediately back of the plows.

The depth of the furrow may be regulated by raising or lowering the plow-shares, by means of a small bolt attached to the chain fastened on the frame of the machine.

K K are the coverers, located beneath the frame, inside and forward of the back carriage-wheels. The coverers are composed of two separate plates, connected by a forked lever attached to the frame of the machine, and held in position by strong bolt-hinges and chains, and are subject to the same movements, to stop their working, as the plows. The outside or forward plate throws the soil from within and beneath the carriage-wheels into the furrows previously dug by the plows. The inside or rear plate of the coverer takes such soil as may have been left by the forward plates, throws it into the furrows, and thereby completes the covering of the furrows and the planting of the grain.

M M are cogs at each end of a lever, connecting the center-wheel G with the counter-wheel H, and are used to communicate movement from one to the other wheel.

L L are two levers attached to the frame of the machine and the shaft and cogs M M. These levers are used to put on or throw off the connection of the cogs M M with the cogs of the wheels G and H. The forward lever L is used to throw on or off the connection at the counter-wheel H, and sets the machine to planting, or stops it, at the will of the driver, without putting him under the necessity of stopping his horses or leaving his seat. The aft lever L is used to throw on or off the connection at the center-wheel G, and sets to work or stops the entire working-portion of the machine. By means of these levers the machine can be so disconnected that it can be driven over any roads from place to place, without interfering in any manner with its working-parts.

The lever attached to the cylinder-shaft B B can be used for dropping the grain, at the will of the driver, when the connection at the counter-wheel H and the cogs M M is thrown off, and is more particularly useful in replanting, as one or both the planting portions of the machine may be used and regulated by this shaft-lever, as the necessity of the work may require.

P P are plugs used to regulate the size of the seed-receptacles in the studs C C, as shown in fig. 2. They increase or diminish the number of grains dropped. These plugs are operated on by the hand, through openings in the cylinders A A, which openings are shown in the drawing.

The right-hand aft carriage-wheel revolves on its axle, for the purpose of facilitating the turning of the machine when the planting-parts are in operation.

The left-hand aft carriage-wheel, being firmly fastened to the axle, revolves the same, communicating motion to the center-wheel G, and, through it, to the entire machine when the connections are on.

Claim.

I claim as my invention—

The particular combination of the wheels G and H, the shafts B B and M M, drums D D, cylinders A A, studs C C, leaders E E, covers K K, levers L L, and plungers P P, together with the plows, substantially as set forth, and for the purposes herein specified.

HENRY AUSTIN NICHOLLS.

Witnesses:
AUGUSTUS BUETELL,
JOHN S. HAY.